Patented June 15, 1948

2,443,280

UNITED STATES PATENT OFFICE 2,443,280

HYDROXYLATION PROCESS

Daniel Swern, Philadelphia, and John T. Scanlan, Wyndmoor, Pa., assignors to United States of America as represented by the Secretary of Agriculture No Drawing. Application May 29, 1946, Serial No. 673,036

13 Claims. (Cl. 260—406)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to an improvement in a process for the hydroxylation of unsaturated compounds. More specifically, it refers to a process for the preparation of alpha-glycols by the hydroxylation of mono-unsaturated aliphatic compounds. As used in this disclosure, the term "alpha-glycols" refers to compounds containing two hydroxyl groups attached to adjacent carbon atoms, as illustrated by the formula

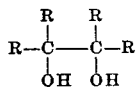

where R is a hydrogen atom or a substituted or unsubstituted aliphatic chain or other substituent.

Alpha-glycols are important intermediates in chemical synthesis. For example, by various well-known methods they may be cleaved to yield aldehydes and acids and by condensation with compounds containing carboxyl groups, they yield valuable polymers. Alpha-glycols prepared from unsaturated compounds which contain the carboxyl group, such as oleic and undecylenic acids, are especially valuable, since upon cleavage these glycols yield dibasic acids as one of their products. The importance of dibasic acids in the preparation of polymers is well known. Long-chain aliphatic glycols and their functional derivatives also have potential value as plasticizers and modifiers, in protective coatings, plastics, lubricants, waxes, textile finishing agents, emulsifiers, and so forth.

Various laboratory methods are available for the prepartion of alpha-glycols from mono-unsaturated aliphatic compounds, but none of these is suitable for the large-scale industrial production of alpha-glycols. We have now discovered that substantially quantitative yields may be obtained by hydroxylating aliphatic mono-unsaturated compounds with hydrogen peroxide and acetic acid, provided that the solution also contains catalytic quantities of a strong acid, such as sulfuric acid. This process requires no special apparatus and employs chemicals which are readily available. In addition, no undesirable by-products are formed, there are no bulky inorganic residues to dispose of such as are encountered in permanganate oxidations, and the volume of reaction mixture per unit weight of product is only a small fraction of that required for alkaline permanganate oxidations.

As is well known, when an aqueous solution of hydrogen peroxide is mixed with acetic acid at room temperature, peracetic acid is formed very slowly. If an unsaturated compound, such as oleic acid, is mixed with the hydrogen peroxide and acetic acid, the peracetic acid is consumed as rapidly as it is formed in oxidizing the oleic acid, but the hydroxylation reaction requires over a week for its completion because of the slow rate of formation of the peracetic acid. This extended reaction period causes considerable loss of active oxygen. Raising the reaction temperature speeds up the reaction considerably but aggravates the loss of active oxygen due to the increased rate of peroxide decomposition with increased temperature. To obtain quantitative hydroxylation with hydrogen peroxide and acetic acid by these prior art procedures, therefore, a considerable excess of hydrogen peroxide must be employed.

We have observed that if a catalytic quantity of a strong acid, such as sulfuric acid, is mixed with the hydrogen peroxide and acetic acid, the rate of formation of the peracetic acid is speeded up considerably at moderate temperatures, preferably at 40° C. or below. Since the peracetic acid reacts almost instantaneously with an unsaturated compound, such as oleic acid, the hydroxylation reaction is complete within a few hours.

Because of the moderate temperatures and the short reaction time, only slightly more (2.5 percent) than the stoichiometric quantity of hydrogen peroxide is required to give a substantially quantitative yield of alpha-glycol. Since hydrogen peroxide leaves only water as a by-product, and acetic acid is readily recovered, isolation of the reaction products is accomplished economically and without difficulty.

The following equations appear to illustrate the reactions involved.

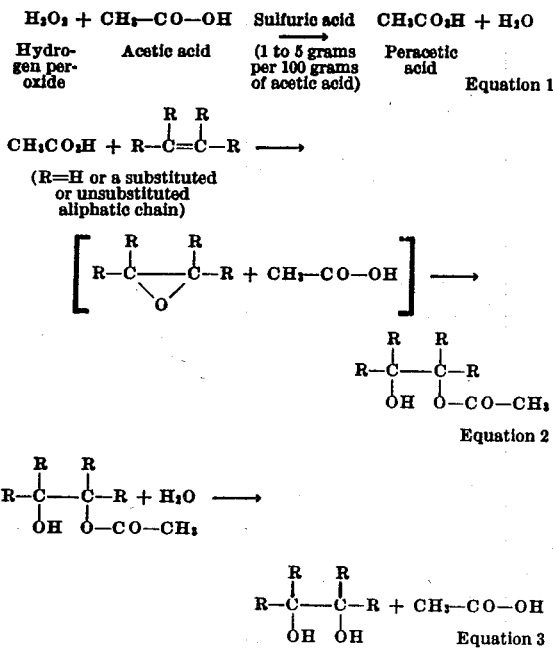

The reaction exemplified by Equation 1 is an equilibrium reaction, and therefore, as the peracetic acid is consumed by reaction with the unsaturated compound (Equation 2), more peracetic acid will be formed and consumed until the hydrogen peroxide is substantially completely used up. The reaction product obtained is an hydroxy-acetoxy compound. Although it may be assumed that this is preceded by an epoxy compound as the initial product of oxidation, this assumption is not a necessary part of this invention. The hydroxy-acetoxy compound obtained in substantially quantitative yield is hydrolyzed to the alpha-glycol in quantitative yield (Equation 3).

*Example I.—Preparation of low-melting 9,10-dihydroxystearic acid from purified oleic acid*

To a well-stirred solution of 14.4 grams (0.05 mole) of 98.3 percent oleic acid (iodine number, 88.4) dissolved in 43.2 ml. of glacial acetic acid at 25° C., 2.3 grams of 95 percent sulfuric acid (5 percent by weight of the acetic acid) was added. 6.75 grams of 25.82 percent hydrogen peroxide (0.0513 mole, 2.5 percent excess) was then added in one portion. The temperature was maintained at 40° C. for six hours. The reaction mixture was then poured into a large excess of cold water and the oxidation product, a white semi-solid, was dissolved in ether. The ether solution was washed acid-free and dried. Recovery of the ether yielded 16.5 grams of hydroxy-acetoxystearic acid. Neutralization Equivalent: calculated, 358; found, 352. This was converted to 9,10-dihydroxystearic acid by saponification with aqueous sodium hydroxide, followed by acidification. Yield of low-melting 9,10-dihydroxystearic acid, 13 grams. Substantially identical results were obtained when acetic acid containing 1 percent and 2.5 percent by weight of sulfuric acid was employed. Usually, we prefer to employ acetic acid containing 2.5 percent by weight of sulfuric acid.

*Example II.—Preparation of high-melting 9,10-dihydroxystearic acid from elaidic acid*

A well stirred solution consisting of 270 grams (0.898 mole) of 94 percent elaidic acid (iodine number, 84.5), 810 ml. of glacial acetic acid, and 20 grams of 95 percent sulfuric acid (2.5 percent by weight of the acetic acid) was heated to 40° C. and 122.8 grams of 25.5 percent hydrogen peroxide (0.922 mole, 2.5 percent excess) was added dropwise over a period of 15 minutes. The temperature was maintained at 40° C. for five hours. The reaction mixture was poured into a large volume of hot water and stirred for several minutes at 95° to 100° C. A semi-solid white upper layer was obtained. The mixture was cooled to room temperature and filtered, the filtrate being discarded. The product was remelted with hot water and stirred for a few minutes to remove additional acetic acid, and the lower aqueous layer was siphoned off and discarded. The product was saponified and acidified. Yield of high-melting 9,10-dihydroxystearic acid, 280 grams.

*Example III.—Preparation of low-melting 9,10-dihydroxystearic acid from red oil (commercial oleic acid)*

To a well stirred solution consisting of 1,000 grams of red oil (iodine number, 94.4; 3.72 moles of double bond), 3,000 ml. of glacial acetic acid and 79 grams of 95 percent sulfuric acid (2.5 percent by weight of the acetic acid) at 25° C., 543 grams of 23.85 percent hydrogen peroxide (3.81 moles, 2.5 percent excess) was added rapidly. The temperature was maintained at 40° C. for about 7 hours. The reaction mixture was poured into a large excess of warm water and stirred well. The upper, oily layer was washed once with warm water. The product, which was semi-solid at room temperature, was saponified with an excess of 3 N aqueous sodium hydroxide solution and then acidified. The crude 9,10-dihydroxystearic acid, which was quite impure because of the large proportion of impurities in the starting material, weighed about 1,000 grams. By washing with petroleum naphtha (hexane fraction boiling range 68-70° C.), about 780 grams of fairly pure 9,10-dihydroxystearic acid was obtained. Neutralization Equivalent: calculated, 316; found, 314.

The conditions of time and temperature disclosed in the examples are not intended to limit the invention to these conditions. Other conditions are satisfactory provided that peroxide decomposition is not accelerated. Also, although we have found that a 2.5 percent molar excess of hydrogen peroxide is satisfactory, other proportions may be employed successfully. In addition, although we have used hydrogen peroxide of 25 percent concentration in the examples given, other concentrations may be used with satisfactory results. Also, the ratio of acetic acid to unsaturated compound may be varied within wide limits. The methods employed for isolating the reaction products are also amenable to variation to suit the size of the batch and the starting material. Likewise, the hydroxylation method described in this disclosure is applicable to the hydroxylation of other mono-unsaturated compounds such as ethylene, propylene, amylene, octene, decene, dodecene, tetradecene, hexadecene, octadecene and the like, palmitoleic, hexadecenoic, petroselinic, vaccenic, ricinoleic, ricinelaidic acids and the like, esters of these unsaturated acids, hexadecenol, oleyl alcohol, elaidyl alcohol and the like. The method is a general one for the hydroxylation of mono-unsaturated compounds.

Having thus described our invention, we claim:

1. A process for the preparation of low-melting 9,10-dihydroxystearic acid which comprises reacting oleic acid with a mixture of hydrogen peroxide, acetic acid, and catalytic quantities of sulfuric acid followed by hydrolysis of the resulting product.

2. A process for the preparation of high-melting 9,10-dihydroxystearic acid which comprises reacting elaidic acid with a mixture of hydrogen peroxide, acetic acid, and catalytic quantities of sulfuric acid followed by hydrolysis of the resulting product.

3. The process described in claim 1 in which substantially equimolar proportions of hydrogen peroxide and oleic acid are employed.

4. The process described in claim 2 in which substantially equimolar proportions of hydrogen peroxide and elaidic acid are employed.

5. A process of making a polyhydric compound having hydroxyl groups on adjacent carbon atoms which comprises reacting a mono-olefinic compound taken from the group consisting of high molecular weight mono-olefinic aliphatic carboxylic acids and their esters with a mixture of hydrogen peroxide, acetic acid, and catalytic quantities of sulfuric acid followed by hydrolysis of the product.

6. The process of claim 5 in which the mono-olefinic compound is an acid having the formula $CH_3-(CH_2)_7-CH=CH-(CH_2)_7-COOH$.

7. The process of claim 5 in which the mono-olefinic compound is an acid having the formula $CH_3-(CH_2)_7-CH=CH-(CH_2)_7-COOH$, and in which the said reacting is carried out at no higher than about 40° C.

8. A process of making a polyhydric compound having hydroxyl groups on adjacent carbon atoms which comprises reacting a mono-olefinic compound taken from the group consisting of high molecular weight mono-olefinic aliphatic carboxylic acids and their esters with a mixture of hydrogen peroxide, acetic acid, and catalytic quantities of a strong mineral acid followed by hydrolysis of the product.

9. The process of claim 8 in which the mono-olefinic compound is an acid having the formula $CH_3-(CH_2)_7-CH=CH-(CH_2)_7-COOH$.

10. The process of claim 8 in which the olefinic compound contains an open chain of six or more carbon atoms.

11. A process of making a dihydric compound, having hydroxyl groups on adjacent carbon atoms, comprising reacting a mono-olefinic high molecular weight aliphatic carboxylic acid with a mixture of hydrogen peroxide, acetic acid, and catalytic quantities of a strong mineral acid, followed by hydrolysis of the product.

12. The process of claim 11 in which the mineral acid is sulfuric acid.

13. A process of preparing a polyhydric compound having hydroxyl groups on adjacent carbon atoms which comprises reacting a mono-olefinic aliphatic compound with a mixture of hydrogen peroxide, acetic acid, and catalytic quantities of sulfuric acid, said mono-olefinic compound being substituted on an olefinic carbon atom by a radical of the group consisting of unsubstituted aliphatic hydrocarbon radicals and aliphatic hydrocarbon radicals substituted by a radical of the group consisting of carboxy and hydroxy radicals and esters thereof.

DANIEL SWERN.
JOHN T. SCANLAN.

REFERENCES CITED

The following references are of record in the file of this patent:

UNITED STATES PATENTS

| Number | Name | Date |
|---|---|---|
| 2,267,248 | Milas | Dec. 23, 1941 |
| 2,285,059 | Scanlan et al. | June 2, 1942 |